(12) United States Patent
Purpura et al.

(10) Patent No.: US 9,454,733 B1
(45) Date of Patent: Sep. 27, 2016

(54) TRAINING A MACHINE LEARNING MODEL

(71) Applicant: Context Relevant, Inc., Seattle, WA (US)

(72) Inventors: Stephen Purpura, Seattle, WA (US); James E. Walsh, Woodinville, WA (US); Dustin Lundring Rigg Hillard, Seattle, WA (US)

(73) Assignee: Context Relevant, Inc., Seattle, WA (US)

( * ) Notice: Subject to any disclaimer, the term of this patent is extended or adjusted under 35 U.S.C. 154(b) by 318 days.

(21) Appl. No.: 13/968,231

(22) Filed: Aug. 15, 2013

Related U.S. Application Data

(60) Provisional application No. 61/683,692, filed on Aug. 15, 2012, provisional application No. 61/691,256, filed on Aug. 20, 2012.

(51) Int. Cl.
*G06N 7/00* (2006.01)
*G06N 99/00* (2010.01)
*G06N 7/08* (2006.01)

(52) U.S. Cl.
CPC .............. *G06N 99/005* (2013.01); *G06N 7/00* (2013.01); *G06N 7/08* (2013.01)

(58) Field of Classification Search
None
See application file for complete search history.

(56) References Cited

PUBLICATIONS

Paulsen, et al., Fitting Mixed-Effects Models When Data are Left Truncated, Insurance: Mathematics and Economics, 43, 2008, pp. 1-13.*

* cited by examiner

*Primary Examiner* — Wilbert L Starks
(74) *Attorney, Agent, or Firm* — Fish & Richardson P.C.

(57) ABSTRACT

Methods, systems, and apparatus, including computer programs encoded on computer storage media, for training a machine learning model. One of the methods includes receiving a complete set of training data; receiving instructions to train a predictive model having a plurality of parameters on an initial subset of the complete set of training data; training the predictive model on the initial subset; storing data representing a first state of the predictive model after training the predictive model on the initial subset; receiving updated parameter values and instructions to train the predictive model on a new subset of the complete set of training data; and training the predictive model on the new subset.

48 Claims, 3 Drawing Sheets

TRAINING A MACHINE LEARNING MODEL

CROSS REFERENCE TO RELATED APPLICATIONS

This application is a non-provisional of and claims priority to U.S. Provisional Patent Application No. 61/683,692, filed on Aug. 15, 2012, and U.S. Provisional Patent Application No. 61/691,256, filed on Aug. 20, 2012, both of which are hereby incorporated by reference.

BACKGROUND

This specification relates to training machine learning models.

Machine learning models can be trained using a limited-memory Broyden-Fletcher-Goldfarb-Shanno (L-BFGS) process. That is, a machine learning model training system may train a machine learning model by performing multiple iterations of a gradient descent training procedure that uses an L-BFGS process to determine values of the model parameters by finding a minimum or a maximum of a cost function of parameters of the model.

SUMMARY

This specification relates to training machine learning models.

Particular embodiments of the subject matter described in this specification can be implemented so as to realize one or more of the following advantages. The time required to train a predictive model on a large dataset, whether streaming or static, can be greatly reduced. The amount of data necessary to be transmitted, e.g., over a network, to the computer or computers of a server to train the predictive model on the large dataset can be greatly decreased. The amount of time required to re-train a previously trained predictive model, e.g., when a change in the input data has caused the model to perform unsatisfactorily, can be greatly reduced.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
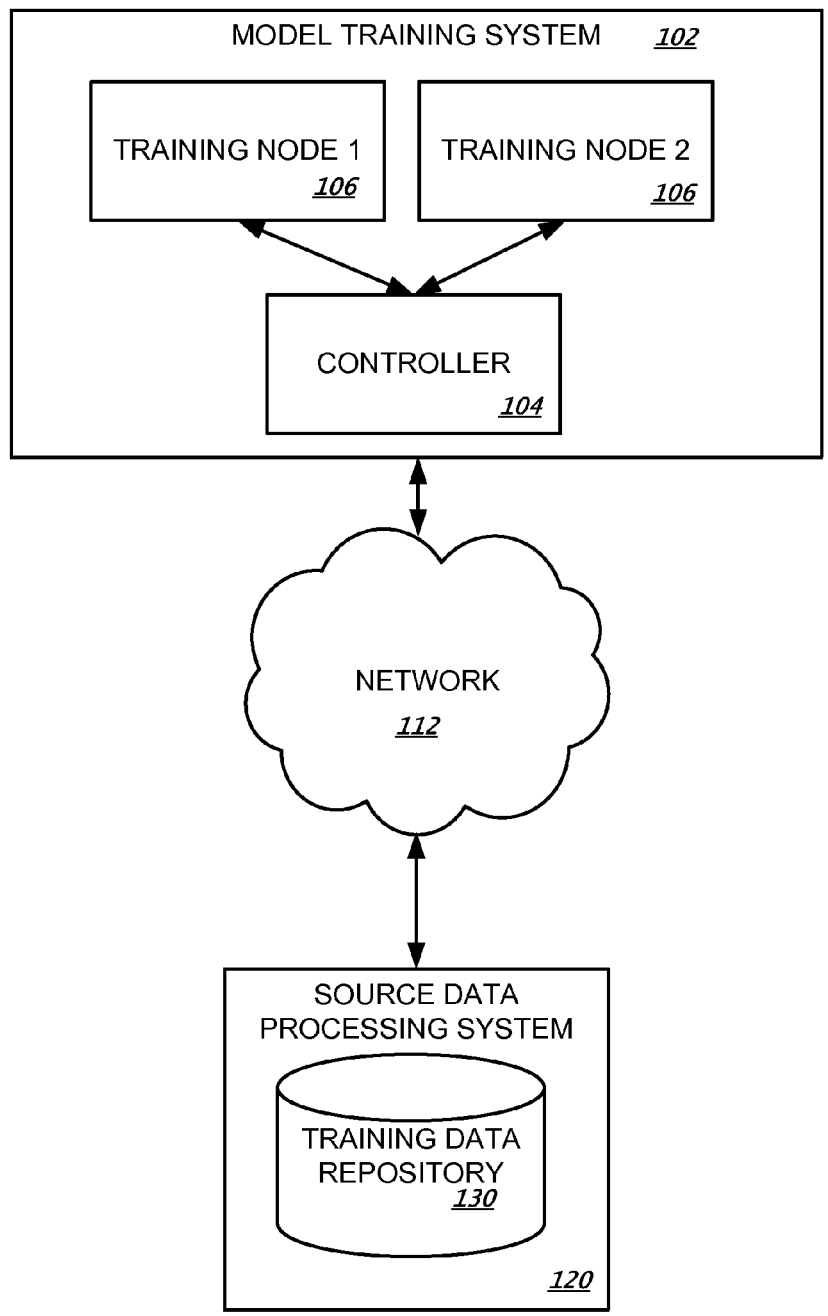
FIG. 1 shows a model training system.

FIG. 1 shows an example model training system 102. The model training system 102 is an example of a system implemented as one or more computer programs on one or more computers in one or more locations, in which the systems, components, and techniques described below can be implemented.

The model training system 102 is coupled to a source data processing system 120 through a data communication network 112, e.g., local area network (LAN) or wide area network (WAN), e.g., the Internet, or a combination of networks, any of which may include wireless links. The model training system 102 receives data from the source data processing system 120 over the network 112 and uses the data to train a machine learning model. In some implementations, the model training system 102 and the source data processing system 120 are implemented on one or more common computers.

The machine learning model is a predictive model that receives an input, i.e., a feature vector, and predicts an output based on the received input and on values of the parameters of the model. The machine learning model is trained using training data from a training data repository 130. The training data in the training data repository 130 are training examples for which the desired output, i.e., the output that should be generated by the model, is known or is estimated. Each example provided to a model—whether for training or, later, for evaluation—will be referred to as a "feature vector," in accordance with convention, although the data can actually be arranged, transmitted, and used in any convenient form. Similarly, each data item in a feature vector will be referred to as a "feature," which has a value. By training a model, the model training system 102 generates values of the model parameters by minimizing or maximizing a cost function that is a measure of the performance of the model on the training data as a function of the model parameters. The trained parameter values may for convenience be referred to as "optimal" values, with the understanding that this usage does not imply that the values are optimal in any absolute sense.

In some implementations, each feature in the feature vector provided for the model includes the data in a corresponding field of a corresponding raw data instance, e.g., data record, of the raw training data stored in training data repository 130. Generally, however, in accordance with conventional practice, the feature vector will be transformed, e.g., the feature values may be standardized or normalized. Optionally, the amount of data can be reduced by using lossy compression, e.g., by a global or feature-specific binning or by using a bitmask data structure. In addition to the feature values derived directly from a single training data value, the features can optionally include values derived from two or more original data values, e.g., by including features with values that are polynomials of normalized feature values up to a small degree, e.g., one or two, values that are a product of two or more feature values, or both. When describing the process from the point of view of a model, each of these is simply a feature. However, where the distinction may be important, feature vectors that result from processing that reduces granularity of any feature value or that reduces the number of fields of raw data that are represented may be referred to as "reduced" feature vectors. The processing of the data to generate the final form of the feature vectors, which may or may not be reduced, can be performed on the source data processing system 120 in order to reduce the amount of data transmitted to the model training system 102.

The model training system 102 includes a controller 104 and multiple training nodes 106. The controller 104, which may be implemented on one or more computers in one or more locations, receives training data from the source data processing system 120 and partitions the training data among the training nodes 106 for use in training the predictive model. Each of the training nodes 106 runs an instance of the predictive model and trains the instance of the model in response to instructions received from the controller 104. Each training node is a computing unit that may include one or more processors, co-processors, graphics processing units (GPUs), or cores and that operates on a complete set of training data to generate, i.a., a set of model parameters as a result of training. Methods for training the model are described in more detail below with reference to FIGS. 2 and 3.

Figure 2:
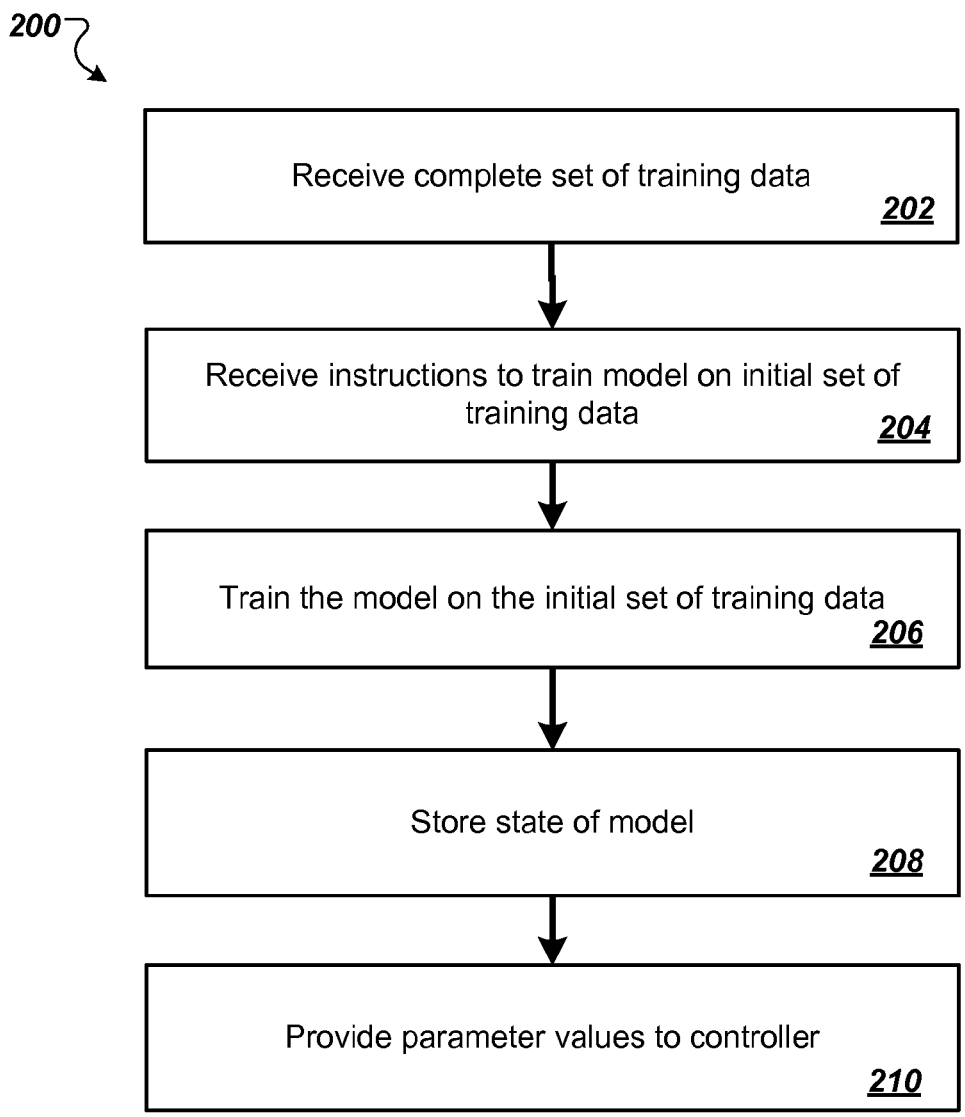
FIG. 2 is a flow diagram of an example process for training a predictive model on an initial set of training data.

FIG. 2 is a flow diagram of an example process 200 for training a predictive model on an initial set of training data. For convenience, the process 200 will be described as being performed by a system of one or more computers located in one or more locations. For example, a training node, e.g., one of the training nodes 106 of FIG. 1, appropriately programmed in accordance with this specification, can perform the process 200.

The process 200 can be performed by each node included in a model training system, e.g., training nodes 106 of FIG. 1, as part of a procedure for training a predictive model. In particular, each node may perform the process 200 in response to instructions received from a controller, e.g., the controller 104 of FIG. 1.

The node receives a complete set of training data (step 202). The complete set of training data may be all of or a subset of the training data received by the model training system in order to train the predictive model. The node can optionally store the complete set of training data in memory, i.e., not on disk. For example, the node can store the complete set of training data in random access memory (RAM). The training data can be a set of reduced feature vectors generated from raw data vectors stored in a training data repository, e.g., the training data repository 130 of FIG. 1.

The node receives instructions to train an instance of a predictive model or a subset of a predictive model on an initial set of training data (step 204) from a controller, e.g., the controller 104 of FIG. 1. The initial set of training data is a subset of the complete set of training data. The initial set may be a random sample of the complete set of training data available to the node or may be selected from the training data available to the node using a different conventional sampling technique.

The node trains a predictive model on the feature vectors in the initial set of training data (step 206). To train the model on the initial set of feature vectors, the node performs multiple iterations of a conventional model training process in order to minimize or maximize the cost function of the model and find optimal values of the model parameters. In particular, the model training process can be a gradient descent model training process that uses a conventional limited-memory Broyden-Fletcher-Goldfarb-Shanno (L-BFGS) process. That is, for each iteration of the gradient descent training process, the L-BFGS process is used to optimize the cost function of the model, i.e., to compute the gradient of the cost function of the model. A gradient descent process that uses L-BFGS to optimize the cost function of a model, e.g., a linear model, will be referred to in this specification as a "L-BFGS training process." Generally, during each iteration of the L-BFGS process, the node uses one or more L-BFGS components to adjust the values of the model parameters. In some variants of L-BFGS, for example, the node may generate an approximation of the Hessian matrix of the cost function, i.e., from an approximation computed during a previous iteration, and use the approximation to generate new values of the model parameters. As another example, in some other variants of L-BFGS, the node may maintain a history of updates of the parameter values of the model and of the gradient of the cost function from a specified number of previous iterations and use those values to generate the new values of the model parameters for the current iteration.

The node continues performing iterations of the L-BFGS process until the model converges, i.e., satisfies one or more specified termination criteria, or until a pre-determined number of iterations are performed.

The node stores the state of the model when the training terminates (step 208). In particular, the node stores the L-BFGS components that were used to update the model parameters during the last iteration of the L-BFGS process and the values of the model parameters after the last iteration of the L-BFGS process. The node can also store values of one or more hyperparameters, e.g., the termination criteria for the L-BFGS process. The node also stores data identifying the feature vectors in the complete set of training data that the node used to train the model and the order in which the node used those feature vectors. The data can also identify which invocation of the node to train the model the feature vectors were used in, i.e., in the initial invocation of the node to train the model. Optionally, the node can mark the feature vectors that were particularly useful in changing the parameter from their initial to their final values, i.e., moving the parameter values generally along a gradient of descent. The node can mark the feature vectors by storing data in any convenient form that identifies the feature vectors.

The node provides the values of the model parameters to the controller (step 210). The controller aggregates the values of the model parameters received from the training nodes to generate updated parameter values. For example, the controller can compute an average of the values received from the training nodes to generate the updated values of the model parameters.

After each node has processed an initial subset of training data, the controller may provide instructions to the nodes to process one or more additional subsets of training data in order to further train the predictive model. Each additional subset of training data includes both old training data and new training data. Old training data is training data from the complete set of training data that the node has already used to train the model, whether in an immediately preceding invocation of the node to train the model or an earlier one. New training data is training data from the complete set of training data that the node has not yet used to train the model. To generate an additional subset of training data, the controller may instruct the node to sample from both old training data and new training data in any of a variety of ways. For example, the feature vectors in the complete set of training data may be ordered, and the instructions may cause the node to select particular feature vectors in the order. As another example, the instructions may cause the node to assume that the old training data and the new training data have respective distributions, and to sample from those distributions randomly. As another example, the instructions may cause the node to sample from the feature vectors that the node has marked as being particularly useful in changing the parameter values. In some implementations, the instructions cause the node to sample from the complete set of training data with reduction, e.g., to generate reduced feature vectors from feature vectors in the complete set of training data as described above.

In order to process the additional training data, the node trains the model on the additional training data using the previously stored state of the model and updated parameter values received from the controller. Processing additional training data is described in more detail below with reference to FIG. 3.

Figure 3:
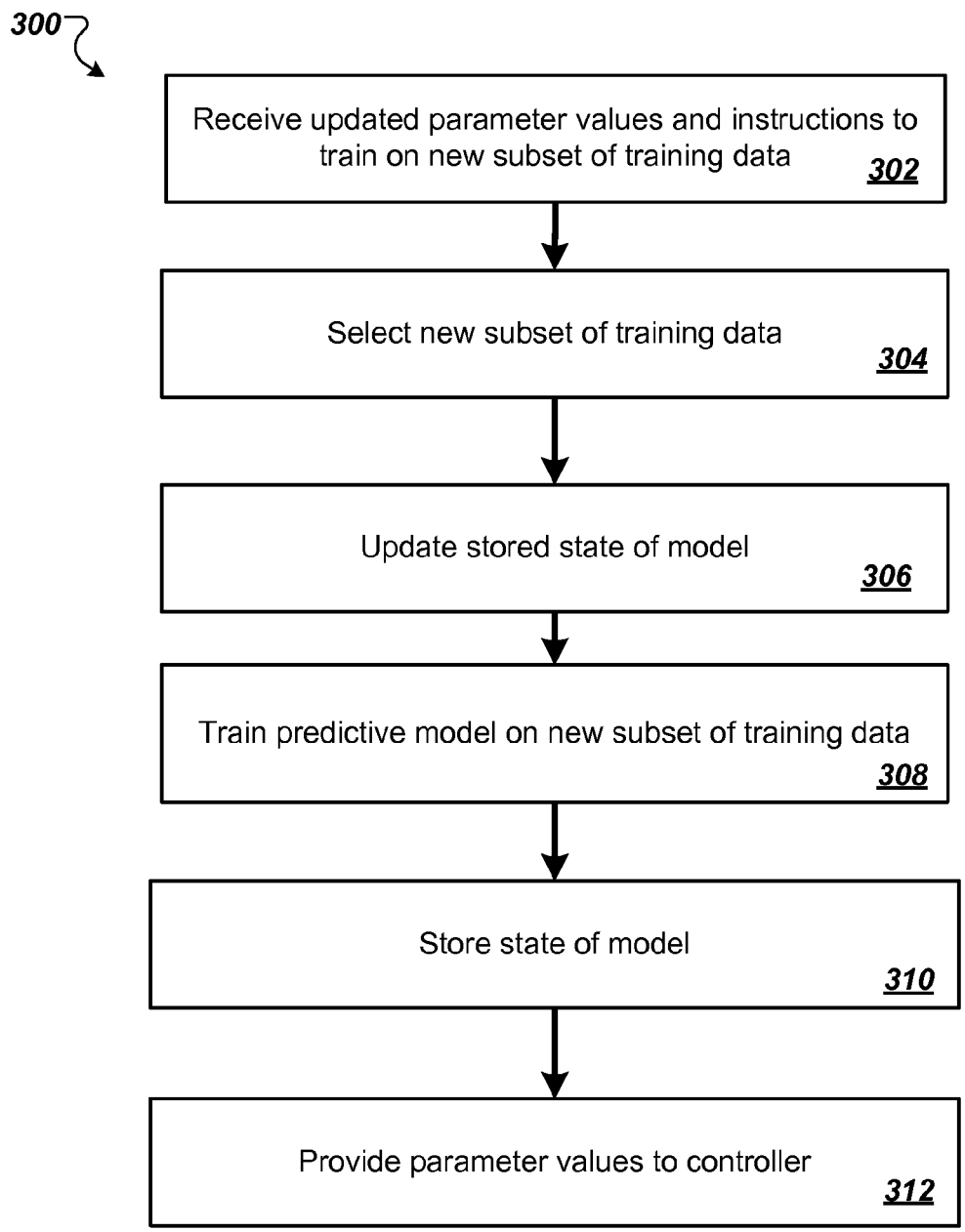
FIG. 3 is a flow diagram of an example process for training a predictive model on a new set of training data.

FIG. 3 is a flow diagram of an example process 300 for training a predictive model on a new set of training data. For convenience, the process 300 will be described as being performed by a system of one or more computers located in one or more locations. For example, a training node, e.g., one of the training nodes 106 of FIG. 1, appropriately programmed in accordance with this specification, can perform the process 300.

The process 300 can be performed by each node included in a model training system, e.g., training nodes 106 of FIG. 1, as part of a procedure for training a predictive model. As part of the training procedure, each of the model replicas may perform the process 300 multiple times. In particular, each node may perform the process 300 in response to instructions received from a controller, e.g., the controller 104 of FIG. 1.

The node receives updated parameter values and instructions to train on a new subset of training data from the controller (step 302). The instructions include instructions that specify how to select the new subset of training data from the complete set of training data.

The node selects from the complete set of training data according to the instructions in order to generate the new subset of training data (set 304). That is, the node makes a first selection of feature vectors from new training data and a second selection of feature vectors from old training data in accordance with the received instructions. For example, the instructions may cause the node to sample a specified percentage of the new subset randomly from old training data and sample the rest of the new subset randomly from new training data. As another example, the instructions may cause the node to sample a specified number of feature vectors in the old training data that meet certain criteria, e.g., are in a specified range in the order that the training data was processed by the node or were used in a specified invocation of the node to train the model, and a specified number of feature vectors from new training data. As another example, the instruction may identify the feature vectors to use.

The node updates the stored state of the model (step 306). That is, the node accesses the previously stored state of the model and replaces the stored values of the model parameters with the updated values of the model parameters received from the controller.

The node trains the predictive model on the new subset of training data using the updated state of the model as the initial state for the training (step 308). In particular, the node performs iterations of the L-BFGS process using the updated state of the model, i.e., the stored L-BFGS components and the updated values of the model parameters, as the initial state for the first iteration of the L-BFGS process. The number of iterations performed can be specified by a user of the model training system. Alternatively, the node may perform iterations of the process until a specified termination condition is satisfied. However, because the node uses the updated state of the model rather than generating new initial values of the L-BFGS components, e.g., without computing a new initial approximation of the Hessian matrix, the number of iterations necessary for the parameters of the model to approach their optimal values can be greatly reduced. Additionally, because the model is being re-trained on only a subset of the old training data, the time necessary to complete an iteration of the L-BFGS process can be greatly reduced.

The node stores the state of the model locally (step 310) and provides the values of the parameters to the controller (step 312). That is, the node stores the L-BFGS components used to update the model parameters and the values of the model parameters generated during the last iteration of the L-BFGS process in place of the previously stored values. Additionally, the node updates the data identifying old training data to include the feature vectors in the new subset of training data and the order that the node operated on the feature vectors in the new subset of training data.

The node also transmits the model parameter values to the controller, i.e., to be aggregated with model parameter values generated by other training nodes. Optionally, the node transmits to the controller data identifying the newly used feature vectors and the order in which they were used to train the model. The node can also transmit to the controller data identifying which training invocation the feature vectors were used during, e.g., whether they were used in training that was initiated in response to an initial invocation to train, a second invocation to train, or a fifth invocation to train. The node can repeat the process 300 for each additional subset of training data that the node is instructed to train on. Thus, the stored state of the model is used in training the model when a new training process is initiated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a computer-implemented node, the method comprising:
    receiving a complete set of training data, wherein the complete set of training data comprises a plurality of feature vectors, and wherein the plurality of feature vectors comprises vectors representing completed financial product transactions including transaction prices;
    receiving instructions to train a predictive model having a plurality of parameters on an initial subset of the complete set of training data, wherein the predictive model is a model predicting a next transaction price or a next transaction price direction for one or more financial products;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

2. The method of claim 1, wherein the model training process is a limited-memory Broyden-Fletcher-Goldfarb-Shanno (L-BFGS) process, and wherein the first state of the predictive model comprises the first parameter values and L-BFGS components used to generate the first parameter values during a last iteration of the L-BFGS process performed on the initial subset.

3. The method of claim 1, wherein training the predictive model on the new subset comprises:

updating the first state of the model by replacing the first parameter values with the updated parameter values; and using the updated state as an initial state for a first iteration of the model training process performed on the new subset.

4. The method of claim 1, further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

5. A non-transitory computer storage medium encoded with a computer program, the program comprising instructions that when executed by a computer-implemented node cause the computer-implemented node to perform operations comprising:

receiving a complete set of training data, wherein the complete set of training data comprises a plurality of feature vectors, and wherein the plurality of feature vectors comprises vectors representing completed financial product transactions including transaction prices;

receiving instructions to train a predictive model having a plurality of parameters on an initial subset of the complete set of training data, wherein the predictive model is a model predicting a next transaction price or a next transaction price direction for one or more financial products;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

6. The computer storage medium of claim 5, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

7. The computer storage medium of claim 5, wherein training the predictive model on the new subset comprises:

updating the first state of the model by replacing the first parameter values with the updated parameter values; and using the updated state as an initial state for a first iteration of the model training process performed on the new subset.

8. The computer storage medium of claim 5, the operations further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

9. A system comprising:

a computer-implemented node storing instructions that when executed by the computer-implemented node cause the computer-implemented node to perform operations comprising:

receiving a complete set of training data, wherein the complete set of training data comprises a plurality of feature vectors, and wherein the plurality of feature vectors comprises vectors representing completed financial product transactions including transaction prices;

receiving instructions to train a predictive model having a plurality of parameters on an initial subset of the complete set of training data, wherein the predictive model is a model predicting a next transaction price or a next transaction price direction for one or more financial products;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

10. The system of claim 9, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

11. The system of claim 9, wherein training the predictive model on the new subset comprises:
updating the first state of the model by replacing the first parameter values with the updated parameter values; and
using the updated state as an initial state for a first iteration of the model training process performed on the new subset.

12. The system of claim 9, the operations further comprising:
operating under control of a controller, including receiving the instructions to train the predictive model on the initial subset and receiving updated parameter values and instructions to train the predictive model on the new subset;
providing the first parameter values to the controller; and
after training the predictive model on the new subset, providing the second parameter values to the controller.

13. A system comprising:
a computer-implemented node storing instructions that when executed by the computer-implemented node cause the computer-implemented node to perform operations comprising:
receiving a complete set of training data, wherein the complete set of training data comprises a plurality of feature vectors, and wherein the plurality of feature vectors comprises vectors representing completed credit card transactions or debit card transactions or both;
receiving instructions to train a predictive model having a plurality of parameters on an initial subset of the complete set of training data, wherein the predictive model is a model classifying particular transactions as likely being anomalous or not;
training the predictive model on the initial subset using a model training process to generate a respective first parameter value for each of the model parameters;
storing data representing a first state of the predictive model after training the predictive model on the initial subset, wherein the first state includes the first parameter values and components of the model training process used to generate the first parameter values;
receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

14. The system of claim 13, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

15. The system of claim 13, wherein training the predictive model on the new subset comprises:
updating the first state of the model by replacing the first parameter values with the updated parameter values; and
using the updated state as an initial state for a first iteration of the model training process performed on the new subset.

16. The system of claim 13, the operations further comprising:
operating under control of a controller, including receiving the instructions to train the predictive model on the initial subset and receiving updated parameter values and instructions to train the predictive model on the new subset;
providing the first parameter values to the controller; and
after training the predictive model on the new subset, providing the second parameter values to the controller.

17. A non-transitory computer storage medium encoded with a computer program, the program comprising instructions that when executed by a computer-implemented node cause the computer-implemented node to perform operations comprising:
receiving a complete set of training data, wherein the complete set of training data comprises a plurality of feature vectors, and wherein the plurality of feature vectors comprises vectors representing completed credit card transactions or debit card transactions or both;
receiving instructions to train a predictive model having a plurality of parameters on an initial subset of the complete set of training data, wherein the predictive model is a model classifying particular transactions as likely being anomalous or not;
training the predictive model on the initial subset using a model training process to generate a respective first parameter value for each of the model parameters;
storing data representing a first state of the predictive model after training the predictive model on the initial subset, wherein the first state includes the first parameter values and components of the model training process used to generate the first parameter values;
receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

18. The computer storage medium of claim 17, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

19. The computer storage medium of claim 17, wherein training the predictive model on the new subset comprises:
updating the first state of the model by replacing the first parameter values with the updated parameter values; and
using the updated state as an initial state for a first iteration of the model training process performed on the new subset.

20. The computer storage medium of claim 17, the operations further comprising:
operating under control of a controller, including receiving the instructions to train the predictive model on the initial subset and receiving updated parameter values and instructions to train the predictive model on the new subset;
providing the first parameter values to the controller; and
after training the predictive model on the new subset, providing the second parameter values to the controller.

21. A method performed by a computer-implemented node, the method comprising:
receiving a complete set of training data, wherein the complete set of training data comprises a plurality of feature vectors, and wherein the plurality of feature vectors comprises vectors representing completed credit card transactions or debit card transactions or both;
receiving instructions to train a predictive model having a plurality of parameters on an initial subset of the complete set of training data, wherein the predictive model is a model classifying particular transactions as likely being anomalous or not;
training the predictive model on the initial subset using a model training process to generate a respective first parameter value for each of the model parameters;
storing data representing a first state of the predictive model after training the predictive model on the initial subset, wherein the first state includes the first parameter values and components of the model training process used to generate the first parameter values;
receiving updated parameter values and instructions to train the predictive model on a new subset of the complete set of training data, wherein the new subset contains feature vectors from the initial subset and new feature vectors from the complete set of training data that have not been used to train the predictive model; and
training the predictive model on the new subset beginning from the first state of the predictive model with the updated parameter values in place of the first parameter values using the model training process to generate a respective second parameter value for each of the model parameters.

22. The method of claim 21, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

23. The method of claim 21, wherein training the predictive model on the new subset comprises:
updating the first state of the model by replacing the first parameter values with the updated parameter values; and
using the updated state as an initial state for a first iteration of the model training process performed on the new subset.

24. The method of claim 21, further comprising:
operating under control of a controller, including receiving the instructions to train the predictive model on the initial subset and receiving updated parameter values and instructions to train the predictive model on the new subset;
providing the first parameter values to the controller; and
after training the predictive model on the new subset, providing the second parameter values to the controller.

25. A system comprising:
a computer-implemented node storing instructions that when executed by the computer-implemented node cause the computer-implemented node to perform operations comprising:
receiving a complete set of training data, wherein the complete set of training data comprises a plurality of feature vectors, and wherein the plurality of feature vectors comprises vectors representing purchase transactions representing purchases of products or services or both and including respective prices paid for the products or services or both;
receiving instructions to train a predictive model having a plurality of parameters on an initial subset of the complete set of training data, wherein the predictive model is further a model classifying particular prices for particular products or services as likely being fraudulent or not;
training the predictive model on the initial subset using a model training process to generate a respective first parameter value for each of the model parameters;
storing data representing a first state of the predictive model after training the predictive model on the initial subset, wherein the first state includes the first parameter values and components of the model training process used to generate the first parameter values;
receiving updated parameter values and instructions to train the predictive model on a new subset of the complete set of training data, wherein the new subset contains feature vectors from the initial subset and new feature vectors from the complete set of training data that have not been used to train the predictive model; and
training the predictive model on the new subset beginning from the first state of the predictive model with the updated parameter values in place of the first parameter values using the model training process to generate a respective second parameter value for each of the model parameters.

26. The system of claim 25, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

27. The system of claim 25, wherein training the predictive model on the new subset comprises:
  updating the first state of the model by replacing the first parameter values with the updated parameter values; and
  using the updated state as an initial state for a first iteration of the model training process performed on the new subset.

28. The system of claim 25, the operations further comprising:
  operating under control of a controller, including receiving the instructions to train the predictive model on the initial subset and receiving updated parameter values and instructions to train the predictive model on the new subset;
  providing the first parameter values to the controller; and
  after training the predictive model on the new subset, providing the second parameter values to the controller.

29. A non-transitory computer storage medium encoded with a computer program, the program comprising instructions that when executed by a computer-implemented node cause the computer-implemented node to perform operations comprising:
  receiving a complete set of training data, wherein the complete set of training data comprises a plurality of feature vectors, and wherein the plurality of feature vectors comprises vectors representing purchase transactions representing purchases of products or services or both and including respective prices paid for the products or services or both;
  receiving instructions to train a predictive model having a plurality of parameters on an initial subset of the complete set of training data, wherein the predictive model is further a model classifying particular prices for particular products or services as likely being fraudulent or not;
  training the predictive model on the initial subset using a model training process to generate a respective first parameter value for each of the model parameters;
  storing data representing a first state of the predictive model after training the predictive model on the initial subset, wherein the first state includes the first parameter values and components of the model training process used to generate the first parameter values;
  receiving updated parameter values and instructions to train the predictive model on a new subset of the complete set of training data, wherein the new subset contains feature vectors from the initial subset and new feature vectors from the complete set of training data that have not been used to train the predictive model; and
  training the predictive model on the new subset beginning from the first state of the predictive model with the updated parameter values in place of the first parameter values using the model training process to generate a respective second parameter value for each of the model parameters.

30. The computer storage medium of claim 29, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

31. The computer storage medium of claim 29, wherein training the predictive model on the new subset comprises:
  updating the first state of the model by replacing the first parameter values with the updated parameter values; and
  using the updated state as an initial state for a first iteration of the model training process performed on the new subset.

32. The computer storage medium of claim 29, the operations further comprising:
  operating under control of a controller, including receiving the instructions to train the predictive model on the initial subset and receiving updated parameter values and instructions to train the predictive model on the new subset;
  providing the first parameter values to the controller; and
  after training the predictive model on the new subset, providing the second parameter values to the controller.

33. A method performed by a computer-implemented node, the method comprising:
  receiving a complete set of training data, wherein the complete set of training data comprises a plurality of feature vectors, and wherein the plurality of feature vectors comprises vectors representing purchase transactions representing purchases of products or services or both and including respective prices paid for the products or services or both;
  receiving instructions to train a predictive model having a plurality of parameters on an initial subset of the complete set of training data, wherein the predictive model is further a model classifying particular prices for particular products or services as likely being fraudulent or not;
  training the predictive model on the initial subset using a model training process to generate a respective first parameter value for each of the model parameters;
  storing data representing a first state of the predictive model after training the predictive model on the initial subset, wherein the first state includes the first parameter values and components of the model training process used to generate the first parameter values;
  receiving updated parameter values and instructions to train the predictive model on a new subset of the complete set of training data, wherein the new subset contains feature vectors from the initial subset and new feature vectors from the complete set of training data that have not been used to train the predictive model; and
  training the predictive model on the new subset beginning from the first state of the predictive model with the updated parameter values in place of the first parameter values using the model training process to generate a respective second parameter value for each of the model parameters.

34. The method of claim 33, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

35. The method of claim 33, wherein training the predictive model on the new subset comprises:

updating the first state of the model by replacing the first parameter values with the updated parameter values; and using the updated state as an initial state for a first iteration of the model training process performed on the new subset.

36. The method of claim 33, further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

37. A system comprising:

a computer-implemented node storing instructions that when executed by the computer-implemented node cause the computer-implemented node to perform operations comprising:

receiving a complete set of training data, wherein the complete set of training data comprises a plurality of feature vectors, and wherein the plurality of feature vectors comprises vectors representing user actions on an interactive computer-based system;

receiving instructions to train a predictive model having a plurality of parameters on an initial subset of the complete set of training data, wherein the predictive model is a model predicting user actions on the interactive computer-based system;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

38. The system of claim 37, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

39. The system of claim 37, wherein training the predictive model on the new subset comprises:

updating the first state of the model by replacing the first parameter values with the updated parameter values; and using the updated state as an initial state for a first iteration of the model training process performed on the new subset.

40. The system of claim 37, the operations further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

41. A non-transitory computer storage medium encoded with a computer program, the program comprising instructions that when executed by a computer-implemented node cause the computer-implemented node to perform operations comprising:

receiving a complete set of training data, wherein the complete set of training data comprises a plurality of feature vectors, and wherein the plurality of feature vectors comprises vectors representing user actions on an interactive computer-based system;

receiving instructions to train a predictive model having a plurality of parameters on an initial subset of the complete set of training data, wherein the predictive model is a model predicting user actions on the interactive computer-based system;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

42. The computer storage medium of claim 41, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

43. The computer storage medium of claim 41, wherein training the predictive model on the new subset comprises:

updating the first state of the model by replacing the first parameter values with the updated parameter values; and using the updated state as an initial state for a first iteration of the model training process performed on the new subset.

44. The computer storage medium of claim 41, the operations further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

45. A method performed by a computer-implemented node, the method comprising:

receiving a complete set of training data, wherein the complete set of training data comprises a plurality of feature vectors, and wherein the plurality of feature vectors comprises vectors representing user actions on an interactive computer-based system;

receiving instructions to train a predictive model having a plurality of parameters on an initial subset of the complete set of training data, wherein the predictive model is a model predicting user actions on the interactive computer-based system;

training the predictive model on the initial subset using a model training process to generate a respective first parameter value for each of the model parameters;

storing data representing a first state of the predictive model after training the predictive model on the initial subset, wherein the first state includes the first parameter values and components of the model training process used to generate the first parameter values;

receiving updated parameter values and instructions to train the predictive model on a new subset of the complete set of training data, wherein the new subset contains feature vectors from the initial subset and new feature vectors from the complete set of training data that have not been used to train the predictive model; and training the predictive model on the new subset beginning from the first state of the predictive model with the updated parameter values in place of the first parameter values using the model training process to generate a respective second parameter value for each of the model parameters.

46. The method of claim 45, wherein the model training process is a limited-memory Broyden Fletcher Goldfarb Shanno (L-BFGS) process, and wherein the first state of the predictive model comprises the first parameter values and L-BFGS components used to generate the first parameter values during a last iteration of the L-BFGS process performed on the initial subset.

47. The method of claim 45, wherein training the predictive model on the new subset comprises:

updating the first state of the model by replacing the first parameter values with the updated parameter values; and using the updated state as an initial state for a first iteration of the model training process performed on the new subset.

48. The method of claim 45, further comprising:

operating under control of a controller, including receiving the instructions to train the predictive model on the initial subset and receiving updated parameter values and instructions to train the predictive model on the new subset;

providing the first parameter values to the controller; and after training the predictive model on the new subset, providing the second parameter values to the controller.

* * * * *